J. SNYDER.
MEAT DEFIBERIZER.
APPLICATION FILED NOV. 29, 1920.
1,436,363.
Patented Nov. 21, 1922.
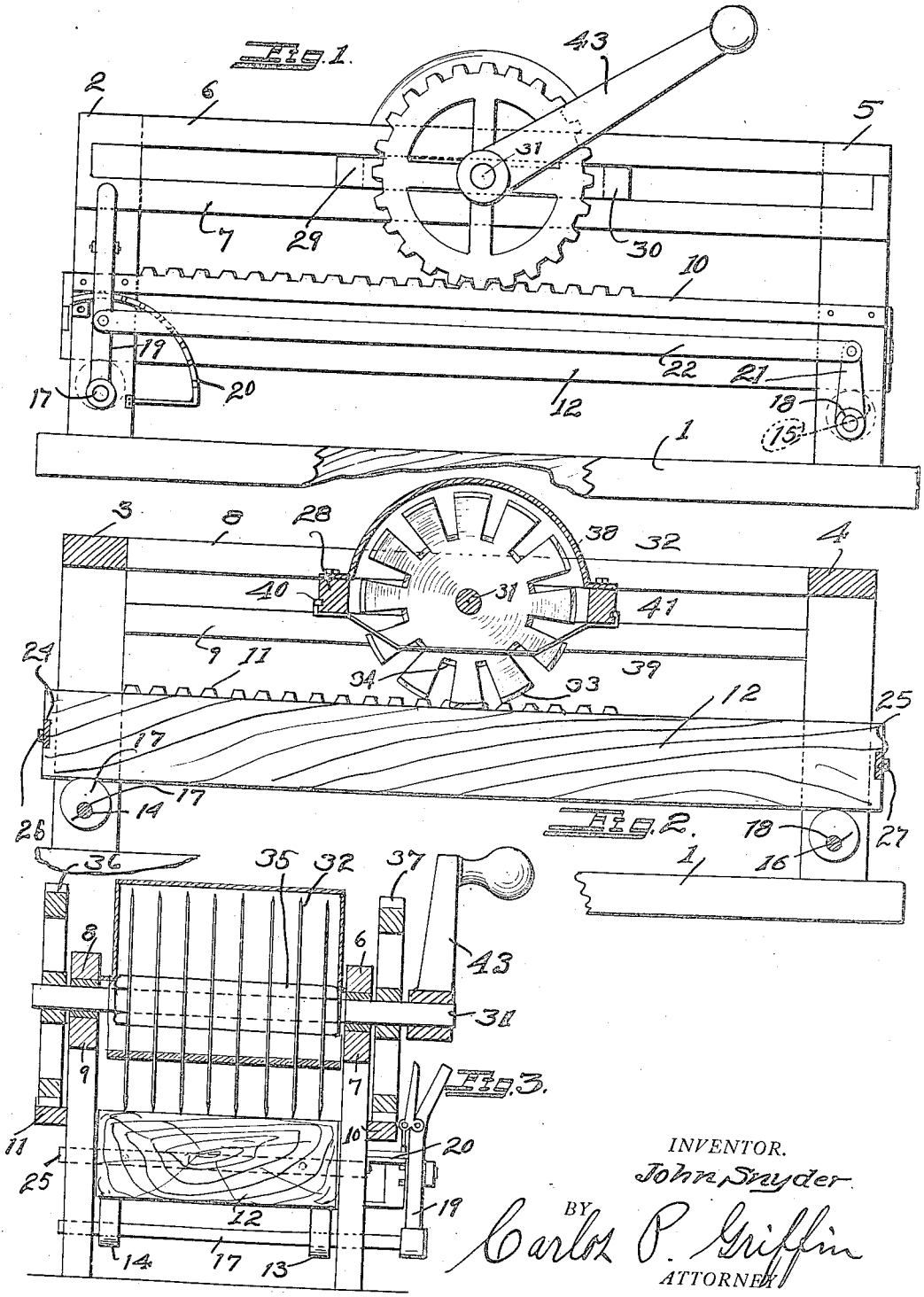

Patented Nov. 21, 1922.

1,436,363

UNITED STATES PATENT OFFICE.

JOHN SNYDER, OF SAN FRANCISCO, CALIFORNIA.

MEAT DEFIBERIZER.

Application filed November 29, 1920. Serial No. 426,898.

*To all whom it may concern:*

Be it known that I, JOHN SNYDER, citizen of the United States, residing at San Francisco, in the county of San Francisco, State of California, have invented a new and useful Meat Defiberizer, of which the following is a specification in such full and clear terms as will enable those skilled in the art to construct and use the same.

This invention relates to a machine for defibreizing meat in order to improve its eating qualities when cooked.

An object of the invention is to provide means whereby a steak may be quickly and completely defibreized without cutting it so that it will separate when cooked.

A further object of the invention is to provide a movable cutting block upon which the steak is placed in order to enable thicker or thinner slabs of meat to be treated.

Another object of the invention is to provide means whereby the defiberizer blades will be positively rotated as they pass over the steak.

Other objects of the invention will appear as the description proceeds.

An embodiment of the invention is shown in the accompanying drawings in which the same reference numeral is applied to the same portion throughout, but I am aware that there may be modifications thereof.

Figure 1 is a side elevation of the complete apparatus.

Fig. 2 is a vertical sectional view of the complete apparatus looking in the same direction as Fig. 1.

Fig. 3 is an end view of the complete apparatus looking from the left Fig. 1, partly in section.

The apparatus is mounted upon a base 1 which may be of a suitable thickness and it has four upwardly extending posts 2 to 5 inclusive. These posts are slotted near the top and they are connected by means of four bars 6 to 9 inclusive. At each side of the machine there is a rack as indicated at 10 and 11, said rack being secured to the vertical posts. Between the posts there is the cutting block 12. This blocks rests upon four cams 13 to 16 inclusive carried by shafts 17 and 18 which are journaled in the lower portion of the vertical posts. The shaft 17 has an operating handle 19 which is adapted to be engaged with notches of a segment 20 secured to the base of the post 2. Said notches determining the adjustment in elevation of the cutting board 12.

The shaft 18 has a lever 21 connected therewith which is in turn pivotally connected with a link 22 pivotally connected with the handle 19 at the same distance from its axis as the length of the lever 21, so that as the handle is adjusted it will adjust the elevation of both ends of the cutting block.

The cutting block has a plate at its ends as indicated at 24, 25 and screws 26, 27 serve to hold the plate when the proper elevation has been determined by the cams 13 to 16 inclusive.

The defiberizer consists of a rectangular frame 28 which has two lugs projecting into the holes formed by the rails 6, 7 and 8, 9 as indicated at 29 and 30. This frame is provided with a shaft 31 carrying a plurality of toothed discs 32 sharpened at 33, 34. The toothed discs are spaced apart by means of a bushing 35 on the shaft 31 and said shaft carries two gear wheels 36, 37 which are in mesh with the racks 10 and 11 respectively.

A hood 38 extends from one portion of the frame to the other portion of the frame over the top of the sharpened discs to protect the user while a series of spring guard plates 39 prevent the meat from working up into the upper portion of the cutting discs. The strippers 39 are sufficiently coarse so that when they are pressed into engagement with one of the bushings 35 that their ends 40, 41 will be disengaged from the slots in the front and back of the frame 28 and enable them to be removed when the discs are to be cleaned.

It is to be observed that ordinarily the left hand end of the cutting block will be used for the purpose of defibreizing the steak, while the right hand end is reserved for the purpose of allowing the cutting frame to be moved along sufficiently so that the guard wheels 36, 37 will be disengaged from the teeth of the racks 10 and 11, the operator to turn the discs to sharpen them. The slot 38 being removed or a suitable sharpening instrument being inserted as may be convenient.

The steak is simply laid upon the top of the cutting block and the discs are rolled over at a time or two by the operation of the crank 43, which is applied to one end of the shaft 31. When it has been cut several times in one position it may be turned over and its position slightly changed and the operation repeated.

If the steak to be cut is too thick for the guard plates 39 to pass over, the block 12 may be lowered by the operation of the handle 19 such an amount as may be convenient, whereupon the discs are rotated over the steak after which the steak is turned over and the knives will penetrate it, from both sides although one side will not be completely cut through by the knives at each travel.

What I claim is as follows, but various modifications may be made in the construction shown in the drawings and above particularly described form, within the purview of my invention:

1. A meat defibreizing machine comprising a frame having two open slots in its outer faces, a shaft journaled therein, a slidable frame movable in said slots, a plurality of sharpened disks carried by the shaft, a guard extending over the top of the sharpened disks and secured to opposite sides of the frame, and a plurality of spring stripper plates having hooks at their opposite ends for detachably engaging the open grooves in the outer edges of the frame to strip the materials treated off the disks.

2. A meat defibreizing machine comprising a frame having two open grooves in its outer faces, a shaft journaled in the frame, a plurality of slotted circular cutters carried by the shaft and spaced from each other, a cover secured to the top of the frame to protect the operator from the cutters, and spring guard plates adapted to be removed from or attached to the frame by having hooks carried thereby sprung into the open grooves in said frame.

In testimony whereof I have hereunto set my hand this 22nd day of Nov., A. D. 1920.

JOHN SNYDER.